(12) United States Patent
Overcash et al.

(10) Patent No.: US 9,141,169 B2
(45) Date of Patent: Sep. 22, 2015

(54) SYSTEM AND METHOD TO CONSERVE POWER IN AN ACCESS NETWORK WITHOUT LOSS OF SERVICE QUALITY

(71) Applicant: CISCO TECHNOLOGY, INC., San Jose, CA (US)

(72) Inventors: Michael Overcash, Lawrenceville, GA (US); Sangeeta Ramakrishnan, Saratoga, CA (US); Alon Bernstein, Monte Sereno, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 255 days.

(21) Appl. No.: 13/624,849

(22) Filed: Sep. 21, 2012

(65) Prior Publication Data

US 2013/0191663 A1    Jul. 25, 2013

Related U.S. Application Data

(60) Provisional application No. 61/588,906, filed on Jan. 20, 2012.

(51) Int. Cl.
G06F 1/32 (2006.01)

(52) U.S. Cl.
CPC ............ *G06F 1/3209* (2013.01); *G06F 1/3203* (2013.01); *G06F 1/325* (2013.01); *G06F 1/3206* (2013.01); *G06F 1/3215* (2013.01); *G06F 1/3278* (2013.01); *G06F 1/3287* (2013.01); *Y02B 60/126* (2013.01); *Y02B 60/1282* (2013.01); *Y02B 60/32* (2013.01)

(58) Field of Classification Search
USPC ........... 713/300, 310, 320, 323, 324; 370/311
See application file for complete search history.

(56) References Cited

U.S. PATENT DOCUMENTS

| | | | |
|---|---|---|---|
| 4,785,927 A | | 11/1988 | Dobbins |
| 5,523,781 A | | 6/1996 | Brusaw |
| 5,802,305 A | * | 9/1998 | McKaughan et al. ........ 709/227 |
| 5,883,901 A | | 3/1999 | Chiu et al. |
| 5,969,748 A | | 10/1999 | Casement et al. |
| 6,233,235 B1 | | 5/2001 | Burke et al. |
| 6,269,343 B1 | | 7/2001 | Pallakoff |
| 6,415,270 B1 | | 7/2002 | Rackson et al. |
| 6,522,265 B1 | | 2/2003 | Hillman et al. |
| 6,618,709 B1 | | 9/2003 | Sneeringer |

(Continued)

OTHER PUBLICATIONS

"Bonjour Sleep Proxy," Wikipedia, the free encyclopedia, [retrieved and printed Aug. 19, 2013], 3 pages; http://en.wikipedia.org/wiki/Bonjour_Sleep_Proxy.

(Continued)

*Primary Examiner* — Tanh Nguyen
(74) *Attorney, Agent, or Firm* — Patent Capital Group

(57) ABSTRACT

A method is provided in one example embodiment and includes receiving a first data at a first network element; determining that the first data does not match an entry in an access control list; and sending a first message to a second network element that causes the second network element to enter into a low-power state. In yet another example embodiment, the method can include receiving a second data; determining that the second data matches an entry in the access control list; buffering the second data; sending a second message to the second network element, where the second message causes the second network element to exit the low-power state; and sending the buffered second data to the second network element.

26 Claims, 4 Drawing Sheets

(56) References Cited

U.S. PATENT DOCUMENTS

| | | | |
|---|---|---|---|
| 6,681,156 B1 | 1/2004 | Weiss | |
| 6,686,709 B2 | 2/2004 | Lee et al. | |
| 6,765,925 B1 | 7/2004 | Sawyer et al. | |
| 6,785,564 B1 | 8/2004 | Quigley et al. | |
| 6,785,592 B1 | 8/2004 | Smith et al. | |
| 6,930,947 B2 | 8/2005 | Chen | |
| 6,980,526 B2 | 12/2005 | Jang et al. | |
| 7,084,752 B2 | 8/2006 | Parello et al. | |
| 7,133,374 B2 * | 11/2006 | Lo et al. | 370/318 |
| 7,177,728 B2 | 2/2007 | Gardner | |
| 7,188,260 B1 | 3/2007 | Shaffer et al. | |
| 7,203,849 B2 | 4/2007 | Dove | |
| 7,233,620 B2 | 6/2007 | Brommer | |
| 7,263,450 B2 | 8/2007 | Hunter | |
| 7,324,518 B2 | 1/2008 | Dai et al. | |
| 7,337,336 B2 | 2/2008 | Ferentz et al. | |
| 7,366,933 B1 | 4/2008 | Aharonian et al. | |
| 7,392,407 B2 | 6/2008 | Jonnala et al. | |
| 7,587,746 B1 | 9/2009 | Schwartzman | |
| 7,698,580 B2 | 4/2010 | Schindler et al. | |
| 7,734,572 B2 | 6/2010 | Wiemeyer et al. | |
| 7,908,501 B2 | 3/2011 | Kim et al. | |
| 7,921,306 B2 | 4/2011 | Dove | |
| 7,941,677 B2 | 5/2011 | Penning | |
| 7,948,963 B2 | 5/2011 | Rioux et al. | |
| 7,957,332 B1 * | 6/2011 | Chow et al. | 370/311 |
| 7,966,502 B2 | 6/2011 | Diab et al. | |
| 7,970,000 B2 | 6/2011 | Roeck | |
| 7,974,298 B2 | 7/2011 | Baird et al. | |
| 8,073,329 B2 | 12/2011 | Gao et al. | |
| 8,160,753 B2 | 4/2012 | Ferentz et al. | |
| 8,225,124 B2 | 7/2012 | Geiger et al. | |
| 8,250,381 B2 | 8/2012 | Hansalia et al. | |
| 8,261,104 B2 | 9/2012 | Landry et al. | |
| 8,301,918 B2 | 10/2012 | Diab et al. | |
| 8,352,754 B2 | 1/2013 | Chin | |
| 8,352,769 B1 | 1/2013 | Ghose et al. | |
| 8,407,332 B1 | 3/2013 | Kralpak et al. | |
| 8,588,120 B2 * | 11/2013 | Lee et al. | 370/311 |
| 8,732,501 B1 | 5/2014 | Ghose et al. | |
| 8,745,429 B2 | 6/2014 | Ghose et al. | |
| 8,799,633 B2 * | 8/2014 | Suganami | 713/2 |
| 8,849,473 B2 | 9/2014 | Claise et al. | |
| 2002/0016639 A1 | 2/2002 | Smith et al. | |
| 2002/0040475 A1 | 4/2002 | Yap et al. | |
| 2002/0157030 A1 | 10/2002 | Barker et al. | |
| 2003/0120959 A1 | 6/2003 | Bohrer et al. | |
| 2004/0148388 A1 | 7/2004 | Chung et al. | |
| 2005/0055589 A1 | 3/2005 | Kojo | |
| 2005/0123109 A1 | 6/2005 | Yamagishi et al. | |
| 2005/0220126 A1 | 10/2005 | Gervais et al. | |
| 2005/0243861 A1 | 11/2005 | Elkayam et al. | |
| 2006/0053324 A1 | 3/2006 | Giat et al. | |
| 2006/0056397 A1 | 3/2006 | Aizu et al. | |
| 2006/0072531 A1 | 4/2006 | Ewing et al. | |
| 2006/0160561 A1 * | 7/2006 | Uno et al. | 455/550.1 |
| 2007/0014268 A1 | 1/2007 | Kim et al. | |
| 2007/0024239 A1 | 2/2007 | Park | |
| 2007/0043477 A1 | 2/2007 | Ehlers et al. | |
| 2007/0050818 A1 | 3/2007 | Berger et al. | |
| 2007/0067445 A1 * | 3/2007 | Vugenfirer et al. | 709/224 |
| 2007/0135086 A1 | 6/2007 | Stanford | |
| 2007/0143637 A1 | 6/2007 | Tsai | |
| 2007/0189257 A1 | 8/2007 | Suzuki et al. | |
| 2007/0214473 A1 | 9/2007 | Barton et al. | |
| 2007/0276547 A1 | 11/2007 | Miller | |
| 2008/0001584 A1 | 1/2008 | Chen | |
| 2008/0037999 A1 | 2/2008 | Masuda et al. | |
| 2008/0052546 A1 | 2/2008 | Schindler et al. | |
| 2008/0063381 A1 | 3/2008 | Conroy et al. | |
| 2008/0168283 A1 | 7/2008 | Penning | |
| 2008/0178232 A1 | 7/2008 | Velusamy | |
| 2008/0215899 A1 | 9/2008 | Jonnala et al. | |
| 2008/0215902 A1 | 9/2008 | Jonnala et al. | |
| 2008/0225841 A1 | 9/2008 | Conway et al. | |
| 2008/0244282 A1 | 10/2008 | Hansalia et al. | |
| 2008/0256371 A1 | 10/2008 | Diab et al. | |
| 2008/0272741 A1 | 11/2008 | Kanamori | |
| 2008/0301322 A1 | 12/2008 | Horibe | |
| 2008/0303486 A1 | 12/2008 | Kao | |
| 2009/0049315 A1 | 2/2009 | Diab et al. | |
| 2009/0070603 A1 | 3/2009 | Diab et al. | |
| 2009/0083167 A1 | 3/2009 | Subbloie | |
| 2009/0132839 A1 * | 5/2009 | Rothman et al. | 713/320 |
| 2009/0182834 A1 | 7/2009 | Zettler et al. | |
| 2009/0195349 A1 | 8/2009 | Frader-Thompson | |
| 2009/0196281 A1 | 8/2009 | Kouchri | |
| 2009/0217063 A1 | 8/2009 | Tomita | |
| 2009/0217188 A1 | 8/2009 | Alexander et al. | |
| 2009/0228723 A1 | 9/2009 | Yoshizaki | |
| 2009/0232039 A1 * | 9/2009 | Jung | 370/311 |
| 2009/0249091 A1 | 10/2009 | Goodnow | |
| 2009/0263127 A1 | 10/2009 | Haran et al. | |
| 2009/0282277 A1 | 11/2009 | Sedarat et al. | |
| 2009/0310607 A1 | 12/2009 | Evans | |
| 2010/0052421 A1 | 3/2010 | Schindler et al. | |
| 2010/0070217 A1 | 3/2010 | Shimada et al. | |
| 2010/0080111 A1 | 4/2010 | Diab et al. | |
| 2010/0111523 A1 | 5/2010 | Hirth et al. | |
| 2010/0145542 A1 | 6/2010 | Chapel et al. | |
| 2010/0162294 A1 | 6/2010 | Yin et al. | |
| 2010/0162305 A1 | 6/2010 | Downey et al. | |
| 2010/0172628 A1 | 7/2010 | Berger et al. | |
| 2010/0205466 A1 | 8/2010 | Diab et al. | |
| 2010/0235868 A1 | 9/2010 | Howarter et al. | |
| 2010/0241880 A1 | 9/2010 | Wertheimer et al. | |
| 2010/0247068 A1 | 9/2010 | Howarter et al. | |
| 2010/0309904 A1 | 12/2010 | Couse | |
| 2010/0322078 A1 | 12/2010 | Wang et al. | |
| 2010/0329108 A1 | 12/2010 | Diab et al. | |
| 2011/0022699 A1 | 1/2011 | Powell et al. | |
| 2011/0029796 A1 | 2/2011 | Matthews et al. | |
| 2011/0067048 A1 | 3/2011 | Barton et al. | |
| 2011/0072286 A1 | 3/2011 | Graham | |
| 2011/0125337 A1 | 5/2011 | Zavadsky | |
| 2011/0131428 A1 | 6/2011 | Diab et al. | |
| 2011/0131438 A1 | 6/2011 | Levitan | |
| 2011/0157939 A1 | 6/2011 | Wang et al. | |
| 2011/0191608 A1 | 8/2011 | Vetteth | |
| 2011/0194474 A1 * | 8/2011 | Kim et al. | 370/311 |
| 2011/0199046 A1 | 8/2011 | Tsai | |
| 2011/0239019 A1 | 9/2011 | Johnston | |
| 2011/0246797 A1 | 10/2011 | Diab et al. | |
| 2011/0320833 A1 | 12/2011 | Mohan et al. | |
| 2012/0045210 A1 | 2/2012 | Kim et al. | |
| 2012/0095610 A1 | 4/2012 | Chapel et al. | |
| 2012/0120958 A1 | 5/2012 | Mahadevan et al. | |
| 2012/0226918 A1 | 9/2012 | Rallo | |
| 2012/0259474 A1 | 10/2012 | Razum et al. | |
| 2012/0284537 A1 | 11/2012 | Kruglick | |
| 2013/0024706 A1 * | 1/2013 | Katar et al. | 713/321 |
| 2013/0061076 A1 | 3/2013 | VerSteeg et al. | |
| 2013/0121172 A1 * | 5/2013 | Cheng et al. | 370/252 |
| 2013/0132745 A1 | 5/2013 | Schoening et al. | |
| 2013/0303202 A1 | 11/2013 | Jafarian et al. | |
| 2013/0332001 A1 | 12/2013 | Parello et al. | |
| 2015/0067815 A1 | 3/2015 | Overcash et al. | |

OTHER PUBLICATIONS

U.S. Appl. No. 14/012,590, filed Aug. 28, 2013, entitled "Configuration of Energy Savings," Inventor Michael Overcash.
"Cisco Energywise"; Cisco Systems; Feb. 1, 2009; archived from http://www.archive.org; pp. 1-6.
"Data Link Layer," Wikipedia, Jun. 28, 2014, 7 pages http://en.wikipedia.org/wiki/Data_link_layer.
"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)," © 2003 IEEE, Jun. 18, 2003, 121 pages (attached as Part 1 and Part 2).

(56) References Cited

OTHER PUBLICATIONS

"Link Layer Discovery Protocol," Wikipedia, Mar. 28, 2014, 4 pages http://en.wikipedia.org/wiki/Link_Layer_Discovery_Protocol.

"Wake on Local Area Network (LAN)," EnergyStar Products, ENERGY STAR; [first published on or about Jul. 29, 2007]; 4 pages http://www.energystar.gov/index.cfm?c=power_mgt.pr_power_mgt_wol.

Bennett, Mike, "IEEE 802.3az Energy Efficient Ethernet," Task Force Update, Presented to the P802.3ba Task Force, Denver, Co; Jul. 16, 2008; 17 pages http://www.ieee802.org/3/az/public/jul08/bennett_03_0708.pdf.

Haran, Onn, "Applicability of EEE to Fiber PHYs," IEEE 8.02.3 EEE Meeting; Sep. 2007, Seoul, Korea http://www.ieee802.org/3/eee_study/public/sep07/haran_1_0907.pdf; 12 pages.

Jetzt, et al., LLDP/LLDP-MED Proposal for PoE Plus; PoE Plus Task Force, Sep. 15, 2006, Knoxville, TN; 15 pages.

Nordman, Bruce, "Energy Efficient Ethernet: Outstanding Questions," Mar. 12, 2007; 3 pages http://grouper.ieee.org/groups/802/3/eee_study/public/mar07/nordman2_01_0307.pdf.

Nordman, Bruce, et al., "Energy Efficiency and Regulation," IEEE 802 Tutorial; Jul. 13, 2009; 58 pages.

SMART Board™, "Interactive Whiteboard," Sep. 2005; © 2005 SMART Technologies, Inc.; 2 pages.

Wertheimer, Aviad and Eric Mann, "Active/Idle Toggling with Low-Power Idle," IEEE 802.3az Jan. 2008 Interim Meeting; 15 pages.

Wertheimer, et al., "Capabilities Negotiation Proposal for Energy-Efficient Ethernet," IEEE 802.3az, May 2008, pp. 1-18.

"MAC Address Definition," The Linux Information Project, Sep. 15, 2005 http://www.info.org.mac_address.html.

* cited by examiner

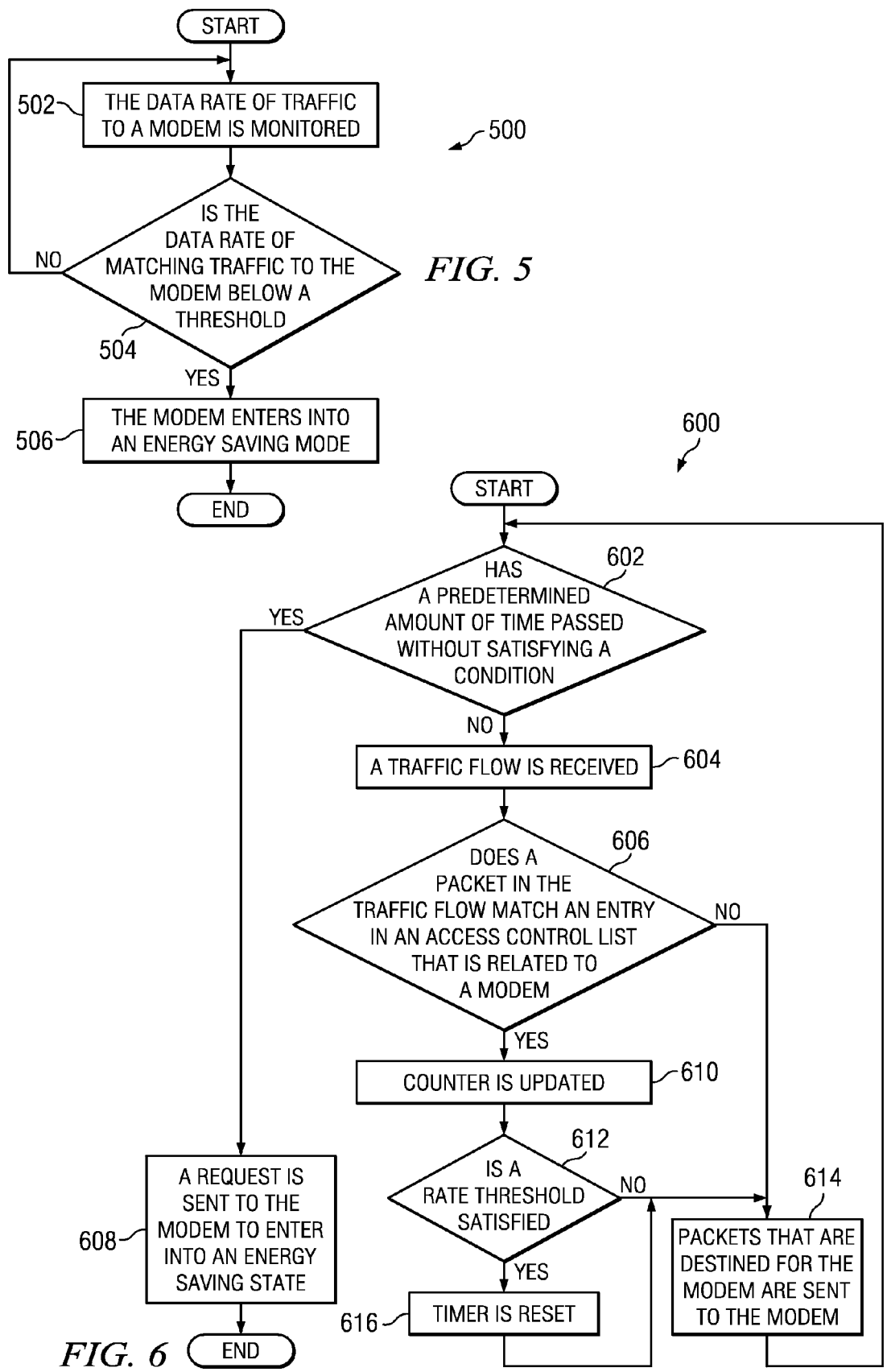

SYSTEM AND METHOD TO CONSERVE POWER IN AN ACCESS NETWORK WITHOUT LOSS OF SERVICE QUALITY

CROSS-REFERENCE TO RELATED APPLICATION

This application claims the benefit of priority under 35 U.S.C. §119(e) to U.S. Provisional Application Ser. No. 61/588,906, "METHOD TO CONSERVE POWER IN DOCSIS NETWORKS WITHOUT LOSS OF SERVICE QUALITY" filed Jan. 20, 2012, which is hereby incorporated by reference in its entirety.

TECHNICAL FIELD

This disclosure relates in general to the field of energy and, more particularly, to a system and a method for conserving power in an access network without loss of service quality.

BACKGROUND

Modern hardware can generally be placed into various low-power states, where various components may be throttled down or disabled altogether. Certain low-power states cause a total loss of network connectivity for some period of time. This makes low-power features difficult (almost impossible) to use for some devices (e.g., set-top boxes and embedded multimedia terminal adapters (eMTAs) that need continuous uninterrupted access to upstream and/or downstream data). It would be beneficial if power savings strategies could be employed as frequently as possible without interrupting important data flows. It would be a further benefit if a system could make intelligent decisions to minimize the energy consumption, while maximizing the user experience.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified flow diagram illustrating potential operations associated with one embodiment of the present disclosure;

FIG. 6 is a simplified flow diagram illustrating potential operations associated with one embodiment of the present disclosure.

DETAILED DESCRIPTION OF EXAMPLE EMBODIMENTS

Overview

A method is provided in one example embodiment and includes receiving a first data at a first network element; determining that the first data does not match an entry in an access control list; and sending a first message to a second network element that causes the second network element to enter into a low-power state. In yet another example embodiment, the method can include receiving a second data; determining that the second data matches an entry in the access control list; buffering the second data; sending a second message to the second network element, where the second message causes the second network element to exit the low-power state; and sending the buffered second data to the second network element.

More specific implementations may include receiving a second data at the first network element, where the second data matches an entry in the access control list; buffering the second data; increasing a number of channels allocated to the second network element; and sending the buffered second data to the second network element. The first network element can be a cable modem termination system (CMTS), and the second network element can be a cable modem (CM). Copies of the access control list are provided in the CMTS and the CM.

Example Embodiments

Figure 1:
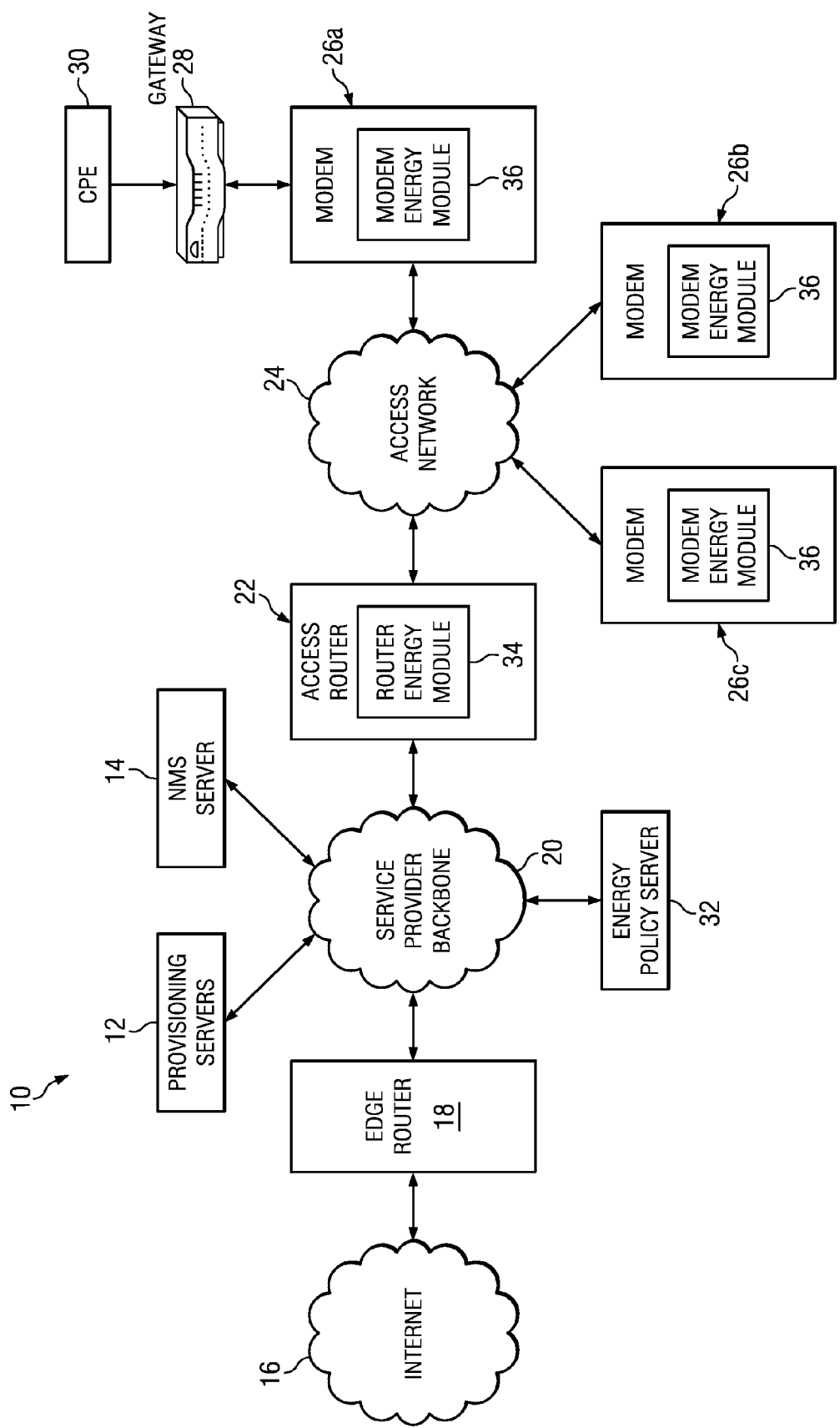
FIG. 1 is a simplified block diagram of an energy management system in accordance with one embodiment of the present disclosure.

FIG. 1 is a simplified block diagram of an energy management system 10 in accordance with one example implementation of the present disclosure. FIG. 1 includes provisioning servers 12, a network management system (NMS) server 14, an Internet 16, an edge router 18, a service provider backbone 20, an access router 22, an access network 24, a plurality of modems 26a-c, a gateway 28, a customer premise equipment (CPE) 30, and an energy policy server 32. Access router 22 can include a router energy module 34, and each of the plurality of modems 26a-c can include a modem energy module 36.

In general terms, energy management system 10 can be configured to communicate with modems 26a-c to shift from one power state to a different power state. More specifically, access router 22 and modems 26a-c can use access control lists (ACLS) to identify important data when making decisions about the desired power saving state of modems 26a-c. Note that while in the examples discussed herein, an ACL is used as a way to sort or to classify traffic, other methods may equally be used, such as a data over cable service interfaces specification (DOCSIS) classifier, a telecommunications access method (TCAM), etc. If a specific modem (e.g., modem 26a) is in a reduced power state, access router 22 and the modem can buffer important data to minimize data loss. Any unimportant data may be ignored or deliberately lost, thereby allowing the modem to remain in a deeper power savings state. In an embodiment, all (or a portion) of the unimportant data can also be buffered.

When the modem exits the power saving state and enters a state that would allow the modem to receive the data, access router 22 can send the buffered data to the modem. Further, when the modem exits the power saving state, the modem can send any buffered data from the modem to the access router. From a business perspective, the smart loading capabilities of the architecture allow for realizable cost savings. Furthermore, energy management system 10 may provide a mechanism that can identify import data and wake the modem to receive the important data or to send the important data.

In one example implementation, the modem may use a combination of power savings strategies. For example, the modem may utilize duty-cycle based power savings, where the modem moves into a low-power standby state and periodically wakes up to look for a wake-up signal from access router 22. In another example, the modem may decrease the number of utilized channels and/or transmitters. Further, the modem may enter into a "light sleep" mode, where a single downstream channel remains active and all the other downstream channels and all upstream transmitters are in a standby mode. The single downstream channel can watch for wake-up signals. In addition, the modem may change the modulation profile used for the upstream transmitters, and access router 22 may use reduced bitrates and smaller constellations to achieve the same bit error rate while using less transmit power.

For purposes of illustrating certain example techniques of energy management system 10, it is important to understand how energy management system 10 conserves power. The following foundational information may be viewed as a basis from which the present disclosure may be properly explained. Such information is offered earnestly for purposes of discussion only and, accordingly, should not be construed in any way to limit the broad scope of the present disclosure. DOCSIS is a telecommunications standard that permits the addition of high-speed data transfer to an existing cable TV (CATV) system. DOCSIS is employed by many cable television operators to provide Internet access over existing hybrid fiber-coaxial (HFC) infrastructure. A DOCSIS architecture generally includes two primary components: a cable modem (CM) located at a customer premises (e.g., more generally represented as modem 26a) and a cable modem termination system (CMTS) located at a CATV headend (e.g., more generally represented as access router 22). Cable systems supporting on-demand programming typically use a hybrid fiber-coaxial system. Fiber optic lines bring digital signals to nodes in the system, where they are converted into RF channels and modem signals on coaxial trunk lines.

A DOCSIS cable modem hardware (e.g., modem 26a) can generally be placed into various low-power states, where hardware components may be throttled down or disabled altogether. These hardware components can include a tuner, demodulator, upstream transmitter, main central processing unit (CPU), etc. Some low-power states cause a total loss of network connectivity for some period of time. This makes low-power features difficult or impossible to use for devices like set-top boxes and embedded media terminal adapters (eMTAs) that need continuous uninterrupted access to upstream and/or downstream data. Other low-power states reduce the usable bandwidth available to data consumers. For example, it is desirable for the usable bandwidth to adjust up and down automatically to maximize the potential power savings while minimizing the negative effects to the end user experience. To be effective, these power savings strategies may be employed as frequently as possible without interrupting important data flows.

To identify important data flows, an access router (e.g., access router 22) can be configured with upstream and downstream ACLs. Each ACL may include expressions to match traffic at OSI Layer 2, Layer 3, Layer 4, or any suitable combination thereof. For each modem (e.g., modem 26a-c) in communication with the access router, the access router can monitor the data rate of packets matching ACLs. In addition, each modem may be used to make decisions about entering or leaving power saving states. In an embodiment, each modem can be provisioned with the same or different ACLs that may or may not contain entries from the ACLs in the access router. In another embodiment, each modem may be provisioned with the same ACLs. The ACLs can include packet matching parameters, rate thresholds, time thresholds, timers, etc.

Note that DOCSIS Packet Classifiers are functionally equivalent to ACLs in this context. In an embodiment, when implementing the ACLs, packets such as Address Resolution Protocol (ARP) packets can be identified based on parameters such as the target address. An ARP may be filtered based on parameters within the body of the ARP (e.g., a target hardware address). Other network elements performing network traffic shaping functions may also use the ACLs to identify important traffic.

The access router can be configured to monitor the aggregate data rate used by a cable modem and adjust downstream/upstream channel allocation accordingly. By consolidating traffic on fewer channels, the access router can make a tradeoff between traffic engineering efficiency and modem power consumption. This may be beneficial when the overall network usage is low. Likewise, each modem may request a smaller channel set based on information from a CPE (e.g., CPE 30) or an end user.

In aggressive power savings modes, the access router may only allocate enough channels for important data and data loss can occur for unimportant data. (Important data can be described by the ACLs.) Likewise, the access router may reduce the channels allocated to one or more modems based on its own power-savings needs (e.g., a brownout). In extreme cases, one or more modems may employ only a single downstream channel and not use a transmitter. In one example, the downstream channel can continue to forward multicast traffic. Each modem can restore the upstream channel upon receiving a signal from the access router or based on the need to forward important data.

In another example, if all ACLs show a long enough period of inactivity, each modem may be placed into a standby mode, where no data can be sent or received until the access router sends a wake-up signal. For all the modems connected to the access router, the wake-up signal can optionally indicate which specific modems have data pending at the access router. In an embodiment, the wake-up signal may be delivered using a DOCSIS Media Access Control (MAC) Management Message, so the wake-up process can be effective even if a modem does not have an IP address.

Once a modem has been placed into a standby mode, it can remain there until data for the modem matches the ACLs in either the access router or the modem. In one example, the access router can monitor the downstream ACLs and their associated rate thresholds, while the modem can monitor the ACLs applicable to a user network port. Once the important data exceeds a threshold, the access router may send a wakeup signal to the modem, or the modem may initiate a wakeup with the access router. Upon waking up, the modem can use a wake-on-LAN or similar feature to wake the attached CPE devices (e.g., CPE 30) that will receive important data.

The access router can be configured to take into account the power savings mode of different modems when it makes decisions such as modem load balancing. The access router may also take into account the power savings capabilities of each modem when assigning each modem to specific channels. By taking into account the power savings capabilities of each modem, the current power savings mode that each modem is in, the tier of service for each modem, and/or the current congestion levels on the network, the access router can make intelligent decisions to minimize the energy consumption of each modem and the access router while maximizing the user experience.

The access router can also be configured to have the capability to force all the modems into certain energy savings modes under certain conditions, such as during brownouts. The access router may also adjust the allocated channels to achieve power savings on the access router itself in combination with power savings on the modems. If enough modems have low bandwidth utilization and aggregate bandwidth utilization is also low, the access router may choose to assign specific channels to each modem such that the access router can shut down some channels or ports and, thereby, reduce energy consumption of the access router.

In an embodiment, energy management system 10 can be configured to allow an end user to control the power dissipation policies of a modem, behaviors that have side effects on the user's experience of delivered services to the modem, and to allow changes to the modem's operating states to be initiated by the end user. In addition, energy management system 10 can be configured by the network and service provider to control the modem's terminal power dissipation policies and behaviors and to allow changes to the modem's operating states to be initiated by application software. In another embodiment, energy management system 10 can inhibit false alarms from network element management systems that might respond to low-power dissipation states of the modem as if they were fault conditions. For example, if network elements (e.g., modems 26a-c) are in a low-power state, a fault condition could be triggered due to packet loss.

Applications running on a CPE can initiate two-way network communications in response to user interaction and autonomously generated events. Network management systems (e.g., provisioning servers 12, NMS server 14, energy policy server 32, etc.) can initiate two-way network communications to agent processes in the CPE. Two-way communications generally have unicast IP source and destination addresses. Often, network management systems repeatedly transmit certain types of information in structures called data carousels. Data carousels may be addressed to broadcast or multicast destinations. Data carousels usually convey information that is needed by the CPE, but that is unsuitable for storage in the CPE's persistent memory. For instance, if the CPE is a set-top box, system information and program guide information changes occasionally and this information would not be reliable when the set-top box activates after a significant time offline. Carousels deliver data with performance independent of the number of set-top boxes served. In addition, broadcast carousels can remain effective in some situations, where upstream communications are impaired.

Several element management and provisioning protocols may use downstream datagram delivery that terminate at the CPE. Some of these datagrams may be unsolicited by the CPE and do not result in any attempt to respond with an acknowledgement. Examples include conditional access Entitlement Management Messages and MPEG DSM-CC passthrough messages when the CPE is a set-top box.

For a low-power dissipation state in which a modem ceases to act on DOCSIS station maintenance opportunities, rapid resumption of a two-way IP data forwarding service is desired when exiting a low-power dissipation state. DOCSIS 1.0/1.1/2.0/3.0 systems typically take 15 to 60 seconds to complete the re-initialization and registration process. Registration delays suffer contributions from the modem, the access routers, servers, etc. Energy management system 10 can be configured to allow these elements to remain synchronized such that a return to full modem operation takes no more than several hundred milliseconds.

The modem might need to maintain values in memory including IP addresses, configuration file settings, service identifier (SID) values, downstream service identifier (DSID) values, service agreement identifier (SAID), BPI+ state, etc. The modem can be configured to keep track of elapsed time. In one example, the modem may be free from having to maintain autonomous tracking of elapsed time during a low-power dissipation state, even though some set-top boxes support scheduled events.

The modem can be configured to send messages that signal entry into a low-power dissipation state and indicate which modem activities that are normally visible are now being suspended. For example, when the modem registers with the network, a server sends a configuration file to the modem. In response, the modem constructs a REG-REQ, REG-REQ-MP, REG-RSP, REG-RSP-MP, etc. message including indications of the modem's capabilities and then sends the message to the access router. The access router can send a REG-RSP, REG-RSP-MP, etc. message to the modem to indicate the modes to be engaged.

In an embodiment, messages from the network to the modem or CPE can be used to communicate policies such as duty cycle, always-be-on time window, whether the downstream receiver should continue to listen for control messages, etc. Policies of direct interest to the access router may be indicated in extensions in REG-REQ, REG-REQ-MP, REG-RSP and REG-RSP-MP DOCSIS MAC Management messages. The modem and the access router can implement these policies only partially and, thus, may need to be discovered or negotiated. In another embodiment, the ranging operations of the modem may be reduced when coming out of a low-power state. For example, the access router may continue to offer station maintenance opportunities so that the modem can go directly to station maintenance and skip initial maintenance.

In one example, RNG-REQ and RNG-RSP messages can be extended to convey an exchange. More specifically, the modem may send a message indicating, "Entering low-power mode now." In response, the access router may send a message indicating, "Acknowledged, return for station maintenance in no longer than X seconds." In another example, a RNG-RSP message may be extended to convey a future time interval over which the next MAP with a station maintenance opportunity would occur so the modem can wake-up just for the maintenance opportunity.

In addition, the RNG-RSP message may be extended to express a signal from the access router to the modem commanding "wake-up for sustained downstream reception for an interval of no less than X seconds," or to separately express "wake-up for two-way operation." The downstream-only reception can be useful if an application needed to push DSG or multicast content like system information or program guide tables.

In one non-limiting example, the modem can continue to be aware of the passage of time in suspended operation modes, with a resolution no coarser than 10 milliseconds. The modem may also consider the uncertainty in its own timekeeping when scheduling future events so that needed wake-up activities sufficiently precede the events of concern. The modem may cease to maintain its local replica of a SYNC time counter during suspended operation modes. Upon waking from a suspended operation mode, the modem can continue using all attributes and parameters that were obtained from the DHCP process if the DHCP lease (or DHCPv6 lease and router advertisement lifetime) has not expired.

Turning to the example infrastructure associated with present disclosure, CPE 30 can be associated with devices, customers, or end users wishing to receive data or content in energy management system 10 via some network. The term 'customer premise equipment' is inclusive of devices used to initiate a communication, such as a receiver, a computer, a set-top box, an Internet radio device (IRD), a cell phone, a smart phone, a tablet, a personal digital assistant (PDA), a Google Android, an iPhone, and iPad, or any other device, component, element, or object capable of initiating voice, audio, video, media, or data exchanges within energy management system 10. CPE 30 may also be inclusive of a suitable interface to the human user, such as a display, a keyboard, a touchpad, a remote control, or other terminal equipment. CPE 30 may also be any device that seeks to initiate a communication on behalf of another entity or element, such as a program, a database, or any other component, device, element, or object capable of initiating an exchange within energy management system 10. Data, as used herein in this document, refers to any type of numeric, voice, video, media, or script data, or any type of source or object code, or any other suitable information in any appropriate format that may be communicated from one point to another.

Service provider backbone 20 and access network 24 each represent a series of points or nodes of interconnected communication paths for receiving and transmitting packets of information that propagate through energy management system 10. Service provider backbone 20 and access network 24 each offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and DOCSIS cable television (CATV). The architecture of the present disclosure may include a configuration capable of transmission control protocol/internet protocol (TCP/IP) communications for the transmission and/or reception of packets in a network.

Access router 22 and modem 26a-c are network elements that can facilitate the power management activities discussed herein. As used herein in this Specification, the term 'network element' is meant to encompass any of the aforementioned elements, as well as switches, cable boxes of any kind (including set-top boxes), CMTSs, CMs, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access router 22 and/or modem 26a include software to achieve (or to foster) the power management activities discussed herein. This could include the implementation of instances of initialization router energy module 34 and/or modem energy module 36. Additionally, each of these elements can have an internal structure (e.g., a processor, a memory element, etc.) to facilitate some of the operations described herein. In other embodiments, these energy management activities may be executed externally to these elements, or included in some other network element to achieve the intended functionality. Alternatively, access router 22 and/or modem 26a may include software (or reciprocating software) that can coordinate with other network elements in order to achieve the power energy management activities described herein. In still other embodiments, one or several devices may include any suitable algorithms, hardware, software, components, modules, interfaces, or objects that facilitate the operations thereof.

Figure 2:
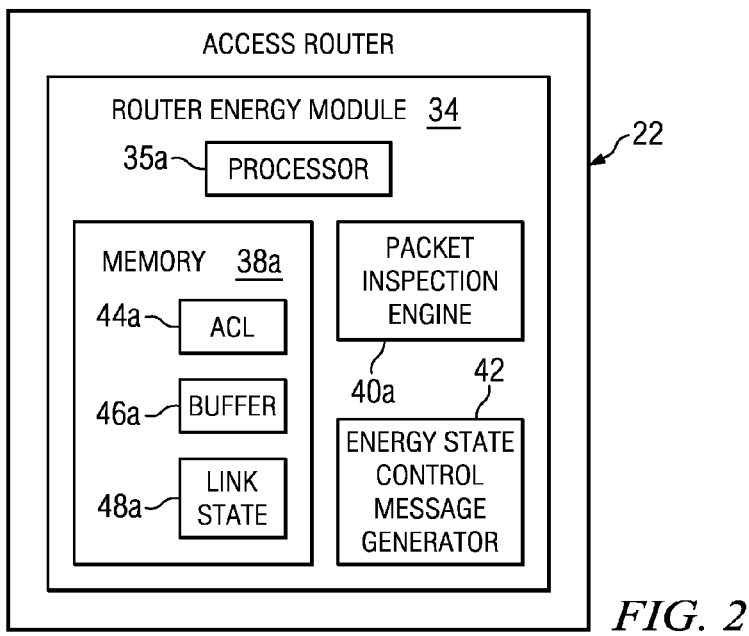
FIG. 2 is a simplified block diagram illustrating possible example details associated with one embodiment of the present disclosure.

Turning to FIG. 2, FIG. 2 is a simplified block diagram illustrating one possible set of details associated with energy management system 10. FIG. 2 includes access router 22 that includes router energy module 34, which includes a processor 35a, a memory 38a, a packet inspection engine 40a, and an energy state control message generator 42. Memory 38a includes an ACL 44a, a buffer 46a, and a link state 48a. ACL 44a can include one or more ACLs. Buffer 46a can include one or more buffers.

In an example implementation, router energy module 34 may be configured to communicate with modem 26a (or modems 26b and 26c) to shift from one power state to a different power state. More specifically, router energy module 34 can use ACL 44a to identify important data when making decisions about the desired power saving state of modem 26a. In addition, router energy module 34 can buffer important data in buffer 46a while modem 26a is in a reduced power state to minimize data loss.

In an embodiment, ACL 44a in router energy module 34 can be configured with one or more upstream and downstream ACLs, and optionally with a rate threshold for each ACL. Each ACL may include expressions to match traffic at OSI Layer 2, Layer 3, Layer 4, or any suitable combination thereof. In addition, router energy module 34 can be configured to monitor the aggregate data rate connected to ACLs and/or used by modem 26a and adjust downstream/upstream channel allocation accordingly. Further, by consolidating traffic on fewer channels, router energy module 34 can be configured to make a tradeoff between traffic engineering efficiency and modem 26a power consumption, which may be beneficial when the overall network usage is low. Likewise, modem 26a may request a smaller channel set based on information from CPE 30 or an end user. If aggregate data rates are low, access router 22 can ask modem 26a to drop down to a smaller number of channels in order to turn off some channels on access router 22 and, thereby, reduce power consumption of access router 22.

Router energy module 34 can be configured to take into account the power savings mode of different modems 26a-c when it makes decisions such as modem load balancing. Router energy module 34 may also take into account the power savings capabilities of each modem when assigning specific channels to each modem. By taking into account the power savings capabilities of modem 26a, the current power savings mode that modem 26a is in, the tier of service for modem 26a, and/or the current congestion levels on the network, router energy module 34 can make intelligent decisions to minimize the energy consumption of modem 26*a* and access router 22 while maximizing the user experience.

Buffer 46*a* may help avoid data loss while modem 26*a* is in a power savings mode, thus making the power saving system invisible (or somewhat seamless) to the end users. In the downstream traffic flow, when data is important (i.e., matches an entry in ACL 44*a*) and cannot be delivered to modem 26*a*, the data can be placed in buffer 46*a*. Access router 22 can continue to buffer data for modem 26*a* until it can bring modem 26*a* back into full service mode (either by sending it a wakeup signal or by increasing the number of channels allocated to it). In one example, modem 26*a* may not need to go back into full service mode and may (instead) move into any mode that provides sufficient connectivity to allow the buffered data to be delivered to modem 26*a*.

In one embodiment, an operator or subscriber may want to discard large amounts of unimportant data at certain times to maximize power savings. To facilitate such an action, the subscriber may push a "deep sleep" button on modem 26*a* that prevents all normal Internet access (e.g., web browsing), but that still allows essential services like VOIP to work normally. Buffering can allow the power savings mode to occur transparently without other network elements being aware of the power saving mode. More specifically, in a set-top network, a headend controller (e.g., Digital Network Control System (DNCS)) periodically sends messages called Entitlement Management Messages (EMMs) in the downstream traffic flow. These messages update entitlements and keys used to decrypt protected content. If multiple EMM refreshes are missed, the set-top will no longer be able to view protected content. With buffering, the EMMs can be delivered even when modem 26*a* is in a low-power mode (e.g., sleeping). The DNCS does not have to be aware of modem's 26 power savings state. Likewise, buffering allows TCP keepalives to be delivered, allowing TCP sessions to remain alive across an otherwise sleeping modem 26*a*.

Packet inspection engine 40*a* can be configured to inspect each packet in upstream and downstream traffic to determine the type of data in each packet. ACL 44*a* can be used to identify important downstream data such as: EMM messages to CableCARDs, incoming phone calls, TCP keepalives (for idle sessions), SNMP polls from the headends, download triggers, etc. Because the downstream traffic flow is flooded with a barrage of low value data such as ARP messages, Neighbor Discovery messages, port scans, attempted TCP connections for non-critical services, spam email delivery, etc., a wakeup or increase in the allocated channels can be triggered only for critical functions. If modem 26*a* is indiscriminately woken up every time such a low value message arrives, then modem 26*a* will have very few opportunities to conserve power. For example, ARPs alone typically arrive at a high rate on the DOCSIS downstream on production headends and a large amount of bandwidth could be consumed by the constant handshaking between access router 22 and modem 26*a* to move modem 26*a* into a sleep mode and subsequently wake it back up again. Energy state control message generator 42 can be configured to optimally communicate messages to modem 26*a*.

Figure 3:
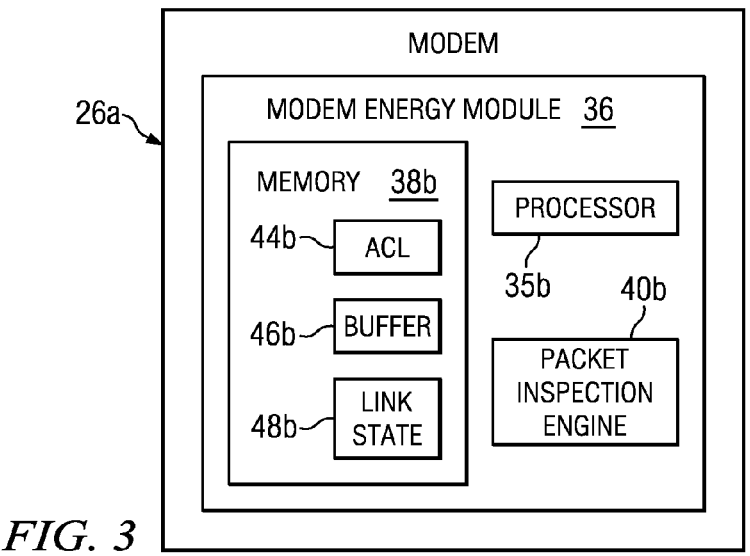
FIG. 3 is a simplified block diagram illustrating possible example details associated with one embodiment of the present disclosure.

Turning to FIG. 3, FIG. 3 is a simplified block diagram illustrating one possible set of details associated with energy management system 10. FIG. 3 includes modem 26*a*. Modem 26*a* may include modem energy module 36, which includes a processor 35*b*, a memory 38*b*, and a packet inspection engine 40*b*. Memory 38*b* includes an ACL 44*b*, a buffer 46*b*, and a link state 48*b*. ACL 44*b* can include one or more ACLs. Buffer 46*b* can include one or more buffers in particular implementations of the present disclosure.

In an example implementation, modem energy module 36 can be configured to communicate with access router 22 to shift from one power state to a different power state. More specifically, modem energy module 36 can use ACL 44*b* to identify important data when making decisions about the desired power saving state of modem 26*a*. Modem energy module 34 can buffer important data in buffer 46*b* while modem 26*a* is in a reduced power state to minimize data loss.

In an embodiment, ACL 44*b* in modem energy module 36 can be configured with one or more upstream and downstream ACLs, and optionally with a rate threshold for each ACL. Each ACL may include expressions to match traffic at OSI Layer 2, Layer 3, Layer 4, or any suitable combination thereof. In addition, modem energy module 36 can be configured to monitor the aggregate data rate used by modem 26*a* and adjust downstream/upstream channel allocation accordingly. By consolidating traffic on fewer channels, modem energy module 36 can be configured to make a tradeoff between traffic engineering efficiency and modem 26*a* power consumption. This may be beneficial when the overall network usage is low. Likewise, modem 26*a* may request a smaller channel set based on information from CPE 30 or an end user.

Buffer 46*b* may help avoid data loss while in these power savings modes, making the power saving system invisible (or somewhat seamless) to the end users of the system. Buffer 46*b* can be used to buffer data in the upstream direction matching the ACLs. In the upstream data flow, when data is important (i.e., matches an entry in ACL 44*b*) and cannot be delivered to access router 22, the data can be placed in buffer 46*b*. Modem 26*a* can continue to buffer data for access router 22 until modem 26*a* is back into full service mode (either by waking up or by increasing the number of channels allocated to it). Buffering can allow the power savings to occur transparently, without other network elements being aware of it at all.

Packet inspection engine 40*b* can be configured to inspect each packet in upstream and downstream traffic and determine the type of data in each packet. ACL 44*b* can be used to identify important upstream data such as: messages from the CableCARD to the CA System (e.g., DNCS), outgoing phone calls, download triggers, etc. If modem 26*a* is indiscriminately woken up every time a low value message needs to be sent, then modem 26*a* will have very few opportunities to conserve power. Hence, a wakeup or increase the allocated channels may be triggered only for certain critical functions.

Figure 4:
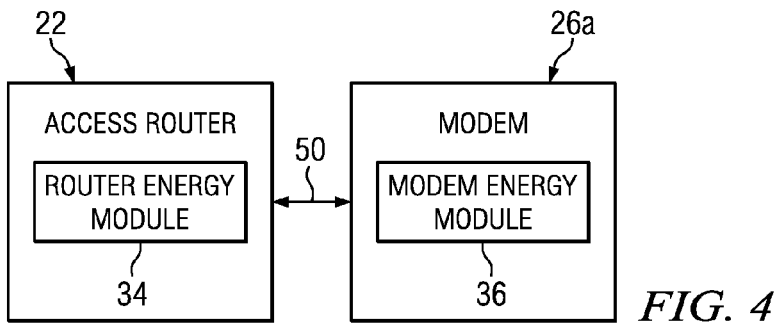
FIG. 4 is a simplified block diagram illustrating possible example details associated with one embodiment of the present disclosure.

Turning to FIG. 4, FIG. 4 is a simplified block diagram illustrating one possible set of details associated with energy management system 10. FIG. 4 includes access router 22 and modem 26*a*. Access router 22 includes router energy module 34. Modem 26*a* includes modem energy module 36. Access router 22 and modem 26*a* are linked together using communication path 50. Communication path 50 may include several different channels that can be used to communicate with one or more modems. Access router 22 can be configured to monitor the aggregate data rate used by modem 26*a* and adjust downstream/upstream channel allocation accordingly. In aggressive power savings modes, access router 22 may only allocate enough channels for important data and data loss would occur for unimportant data. Likewise, access router 22 may reduce the channels allocated to cable modems based on its own power-savings needs (e.g., a brownout). Access router 22 may also adjust the allocated channels to achieve power savings on access router 22 itself in combination with power savings on the cable modems. If enough cable modems have low bandwidth utilization, and aggregate bandwidth utilization is also low, access router 22 may choose to assign channels to the cable modems such that access router 22 can shut down some channels or ports and, thereby, reduce energy consumption of access router 22.

Turning to FIG. 5, FIG. 5 is a simplified flowchart 500 illustrating example activities for conserving power in an access network. At 502, the data rate of traffic to a modem is monitored. For example, router energy module 34 in access router 22 may monitor the data rate of traffic to modem 26*a*. In another example, modem energy module 36 in modem 26*a* may monitor the data rate of traffic to modem 26*a*. At 504, the system determines if the data rate of matching traffic to the modem is below a threshold. For example, the data rate of traffic that matches an entry in an ACL that is related to the modem may be below a data rate threshold. If the data rate of matching traffic to the modem is not below a data rate threshold, then the system returns to 502 and the data rate of traffic to the modem is monitored. If the data rate of matching traffic to the modem is below a threshold, then the modem enters into an energy saving mode, as in 506. For example, if the data rate of traffic to modem 26*a* is below a threshold, then energy state control message generator 42 in router energy module 34 may communicate a message (using communication path 50) to modem 26*a* to enter into an energy saving mode. In another example, if the data rate of traffic to modem 26*a* is below a threshold, then modem energy module 36 may request modem 26*a* to enter into an energy saving mode.

Turning to FIG. 6, FIG. 6 is a simplified flowchart 600 illustrating example activities for conserving power in a network. At 602, the system determines if a predetermined amount of time has passed without satisfying a condition. For example, the system may not receive any important data (e.g., data that matches an entry in an ACL that is related to a modem) within a predetermined amount of time. If a predetermined amount of time has passed without satisfying a condition, then a request is sent to a modem to enter into an energy saving state, as illustrated at 608. If a predetermined amount of time has not passed without satisfying a condition, then a traffic flow is received, as illustrated at 604.

At 606, the system determines if a packet in the traffic flow matches an entry in an ACL that is related to a modem. For example, packet inspection engine 40*a* may inspect a packet in the traffic flow and router energy module 34 may determine if the packet matches an entry in ACL 44*a* that is related to modem 26*a*. If the packet in the traffic flow does not match an entry in an ACL that is related to a modem, then packets that are destined for the modem are sent to the modem, as illustrated at 614, and the system determines if a predetermined amount of time has passed without satisfying a condition, as illustrated at 602. If the packet in the traffic flow does match an entry in an ACL that is related to a modem, then a counter is updated, as illustrated at 610. For example, a counter that determines the predetermined amount of time may be updated.

At 612, the system determines if a rate threshold is satisfied. If the rate threshold is not satisfied, then packets that are destined for the modem are sent to the modem, as illustrated at 614, and the system determines if a predetermined amount of time has passed without satisfying a condition, as illustrated at 602. If the rate threshold is satisfied, then a timer is reset, as illustrated at 616. The timer may be used to determine if a predetermined amount of time has passed, as illustrated at 602. At 614, packets that are destined for the modem are sent to the modem and the system determines if a predetermined amount of time has passed without satisfying a condition, as illustrated at 602.

Figure 7:
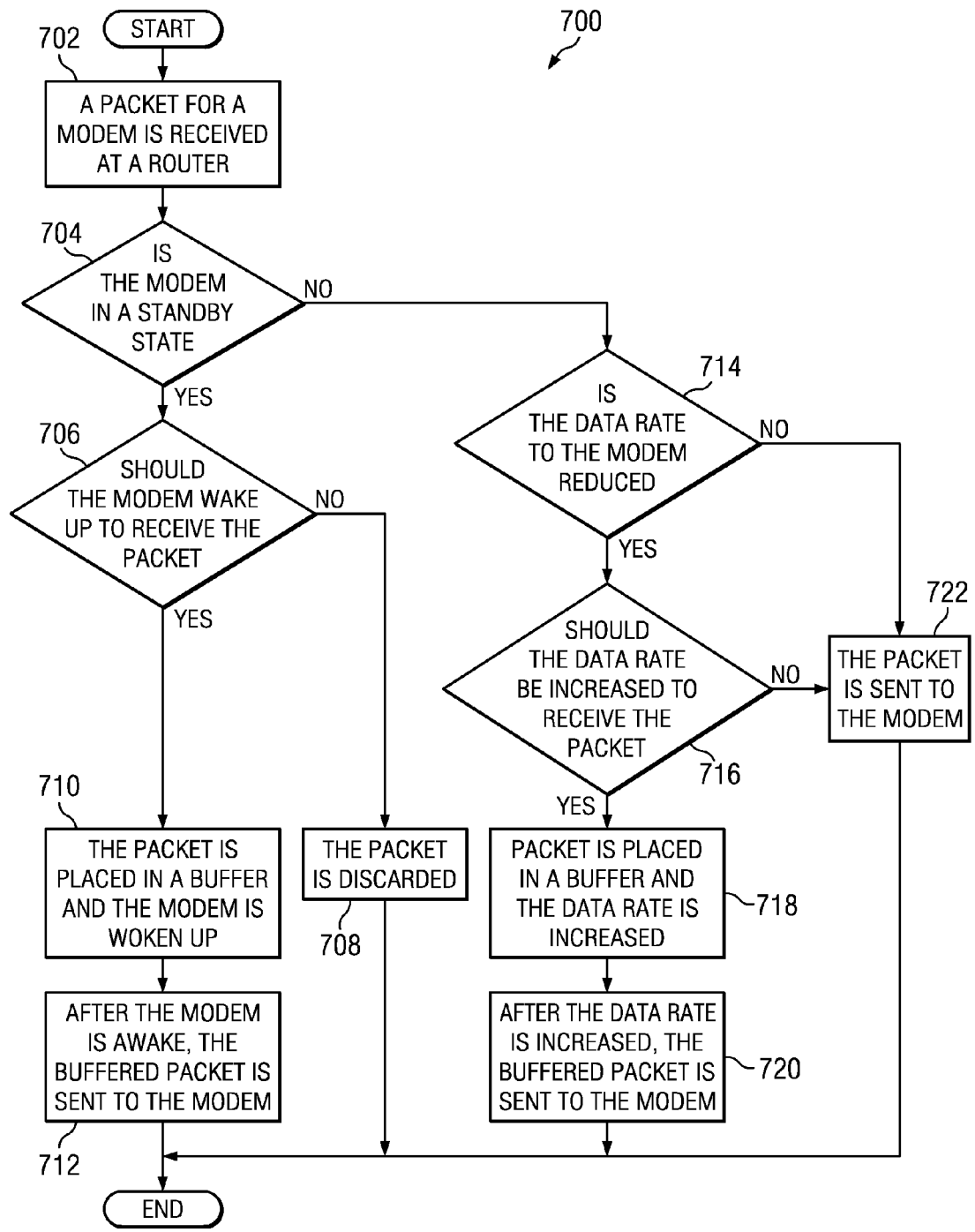
FIG. 7 is a simplified flow diagram illustrating potential operations associated with one embodiment of the present disclosure.

Turning to FIG. 7, FIG. 7 is a simplified flowchart 700 illustrating example activities for conserving power in a DOCSIS network. At 702, a packet for a modem is received at a router. At 704, the system determines if the modem is in a standby state. If the modem is in a standby state, then the system determines if the modem should wake-up to receive the packet, as illustrated at 706. For example, packet inspection engine 40*a* may inspect the packet and if the packet matches an entry in ACL 44*a* then modem 26*a* should wake-up, if the packet does not match an entry in ACL 44*a*, then modem 26*a* should not wake-up. If the modem should not wake-up to receive the packet, then the packet is discarded, as in 708.

If the modem should wake-up, then the packet is placed in a buffer and the modem is woken up, as illustrated at 710. For example, if modem 26*a* should wake-up, then the packet may be placed in buffer 46*a* and energy state control message generator 42 in router energy module 34 may communicate a message (using communication path 50) to modem 26*a* to wake-up. At 712, after the modem is awake, the buffered packet is sent to the modem. Referring to 704, if the modem is not in a standby state, then the system determines if the data rate to the modem is reduced. (Before the packet was received, the data rate (e.g., number of channels) on communication path 50 to modem 26*a* may have been reduced.) If the data rate to the modem is not reduced, then the packet is sent to the modem, as in 722. If the data rate to the modem is reduced, then the system determines if the data rate should be increased to receive the packet, as in 716. For example, packet inspection engine 40*a* may inspect the packet and if the packet matches an entry in ACL 44*a*, then the data rate should be increased.

If the data rate should not be increased to receive the packet, then the packet is sent to the modem, as in 722. Even though the data rate is reduced, delivery of the packet is attempted on a "best effort" basis and it does not matter if the packet is delivered, dropped, discarded, etc. If the data rate should be increased to receive the packet, then the packet is placed in a buffer and the data rate is increased, as illustrated at 718. At 720, after the date rate is increased, the buffered packet is sent to the modem.

As identified previously, a network element can include software to achieve the energy management operations, as outlined herein in this document. In certain example implementations, the energy management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processors 36*a* shown in FIG. 2 and processor 35*b* shown in FIG. 3], or other similar machine, etc.). In some of these instances, a memory element [memory 38*a* shown in FIG. 2 and memory 38*b* shown in FIG. 3] can store data used for the operations described herein. This includes the memory element being able to store software, logic, code, or processor instructions that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the energy management activities as outlined herein. Additionally, each of these devices may include a processor that can execute software or an algorithm to perform the energy management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that energy management system 10 (and its teachings) are readily scalable and, further, can accommodate a large number of components, as well as more complicated/sophisticated arrangements and configurations. Accordingly, the examples provided should not limit the scope or inhibit the broad teachings of energy management system 10, as potentially applied to a myriad of other architectures.

It is also important to note that the steps in the preceding FIGURES illustrate only some of the possible scenarios that may be executed by, or within, energy management system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by energy management system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols (e.g., TCP/IP, ARP, UDP, SNMP, etc.), energy management system 10 may be applicable to other exchanges and protocols in which data are exchanged in order to provide energy management operations. In addition, although energy management system 10 has been illustrated with reference to particular elements and operations that facilitate the communication process, these elements and operations may be replaced by any suitable architecture or process that achieves the intended functionality of energy management system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving, at a first network element, data for a second network element;
    monitoring, at the first network element, a data rate of data that matches an entry in an access control list associated with the second network element;
    when the first network element determines that the data rate of data matching an entry in the access control list associated with the second network element is below a data rate threshold, reducing a number of channels assigned to the second network element to cause the second network element to enter into a power saving state; and
    while the second network element is in the power saving state, buffering, at the first network element, data matching an entry in the access control list for later delivery to the second network element.

2. The method of claim 1, further comprising:
    when the first network element determines that the data rate of data matching an entry in the access control list associated with the second network element is above the data rate threshold, increasing, by the first network element, the number of channels allocated to the second network element to cause the second network element to enter a mode sufficient for receiving data; and
    sending the buffered data from the first network element to the second network element when the second network element enters the mode sufficient for receiving data.

3. The method of claim 1, further comprising:
    when the first network element determines that data does not match an entry in the access control list associated with the second network element for a predetermined amount of time, sending, by the first network element, a message to the second network element that causes the second network element to enter into a standby state.

4. The method of claim 3, further comprising, while the second network element is in the standby state:
    discarding, by the first network element, data that does not match an entry in the access control list associated with the second network element; and
    sending, by the first network element, a wake-up message to the second network element when data matches an entry in the access control list associated with the second network element, wherein the first network element buffers the data while the second network element exits the standby state.

5. The method of claim 4, wherein the wake-up message is delivered when the second network element does not have an IP address.

6. The method of claim 1, wherein the first network element is a cable modem termination system (CMTS), and the second network element is a cable modem (CM).

7. The method of claim 1, wherein the reduced number of channels includes one active downstream channel from the first network element to the second network element and no active upstream channels from the second network element to the first network element.

8. The method of claim 7, further comprising forwarding multicast traffic using the one active downstream channel.

9. The method of claim 4, wherein the first network element reduces the number of channels assigned to the second network element based on power-savings needs of the first network element.

10. The method of claim 1, further comprising discarding data that does not match an entry in the access control list associated with the second network element.

11. The method of claim 1, wherein the first network element and the second network element include a same access control list associated with the second network element.

12. The method of claim 1, further comprising:
receiving, by the first network element, data that the second network element buffered during the power saving state.

13. The method of claim 1, wherein the first network element performs power saving operations for a plurality of network elements, wherein the first network element allocates the a number of channels assigned to the second network element based on a selected one of a group of parameters, the group consisting of:
a) a power savings capability for the network elements;
b) a current power savings mode for the network elements;
c) a tier of service associated with the network elements; and
d) a current congestion level on a network associated with the network elements.

14. A non-transitory media encoded with logic that includes instructions for execution, and when executed by a processor, is operable to perform operations comprising:
monitoring a data rate of data received at a first network element that matches an entry in an access control list associated with a second network element;
when the data rate of data matching an entry in the access control list associated with the second network element is below a data rate threshold, reducing a number of channels assigned to the second network element to cause the second network element to enter into a power saving state; and
while the second network element is in the power saving state, buffering data at the first network element that matches an entry in the access control list for later delivery to the second network element.

15. The non-transitory media of claim 14, further operable to perform operations comprising:
when the data rate of data matching an entry in the access control list associated with the second network element is above the data rate threshold, increasing the number of channels allocated to the second network element to cause the second network element to enter a mode sufficient for receiving data; and
sending the buffered data from the first network element to the second network element when the second network element enters the mode sufficient for receiving data.

16. The non-transitory media of claim 14, further operable to perform operations comprising:
when data does not match an entry in the access control list associated with the second network element for a predetermined amount of time, sending a message from the first network element to the second network element that causes the second network element to enter into a standby state.

17. The non-transitory media of claim 16, further operable to perform operations comprising, while the second network element is in the standby state:
discarding data that does not match an entry in the access control list associated with the second network element; and
sending a wake-up message from the first network element to the second network element when data matches an entry in the access control list associated with the second network element, wherein the first network element buffers the data while the second network element exits the standby state.

18. The non-transitory media of claim 14, wherein the first network element is a cable modem termination system (CMTS), and the second network element is a cable modem (CM).

19. The non-transitory media of claim 14, wherein the reduced number of channels includes one active downstream channel from the first network element to the second network element and no active upstream channels from the second network element to the first network element.

20. The non-transitory media of claim 14, wherein the number of channels assigned to the second network element is reduced based on power-savings needs of the first network element.

21. The non-transitory media of claim 14, further operable to perform operations comprising, discarding data that does not match an entry in the access control list associated with the second network element.

22. An apparatus, comprising:
an energy module configured to set a power saving state of a network element based on data destined for the network element, wherein the energy module includes a memory element for storing data and a processor configured to execute instructions associated with the data, such that the energy module is configured to:
receive data for the network element;
monitor a data rate of data that matches an entry in an access control list associated with the network element;
when the data rate of data matching an entry in the access control list associated with the network element is below a data rate threshold, reduce a number of channels assigned to the network element to cause the network element to enter into a power saving state; and
while the network element is in the power saving state, buffer data matching an entry in the access control list for later delivery to the network element.

23. The apparatus of claim 22, wherein the energy module is further configured to:
when the data rate of data matching an entry in the access control list associated with the network element is above the data rate threshold, increase the number of channels allocated to the network element to cause the network element to enter a mode sufficient for receiving data; and
send the buffered data to the network element when the network element enters the mode sufficient for receiving data.

24. The apparatus of claim 22, wherein the energy module is further configured to:
when data does not match an entry in the access control list associated with the network element for a predetermined amount of time, sending a message to the network element that causes the network element to enter into a standby state.

25. The apparatus of claim 24, wherein the energy module is further configured to, while the network element is in the standby state:
  discard data that does not match an entry in the access control list associated with the network element; and
  send a wake-up message to the network element when data matches an entry in the access control list associated with the network element, wherein the energy module buffers the data while the network element exits the standby state.

26. The apparatus of claim 22, wherein a cable modem termination system (CMTS) includes the energy module, and the network element is a cable modem, such that the CMTS sets a power saving state of the cable modem.

* * * * *